Jan. 26, 1932.  A. SMITH  1,843,047
TURNTABLE
Filed March 25, 1931
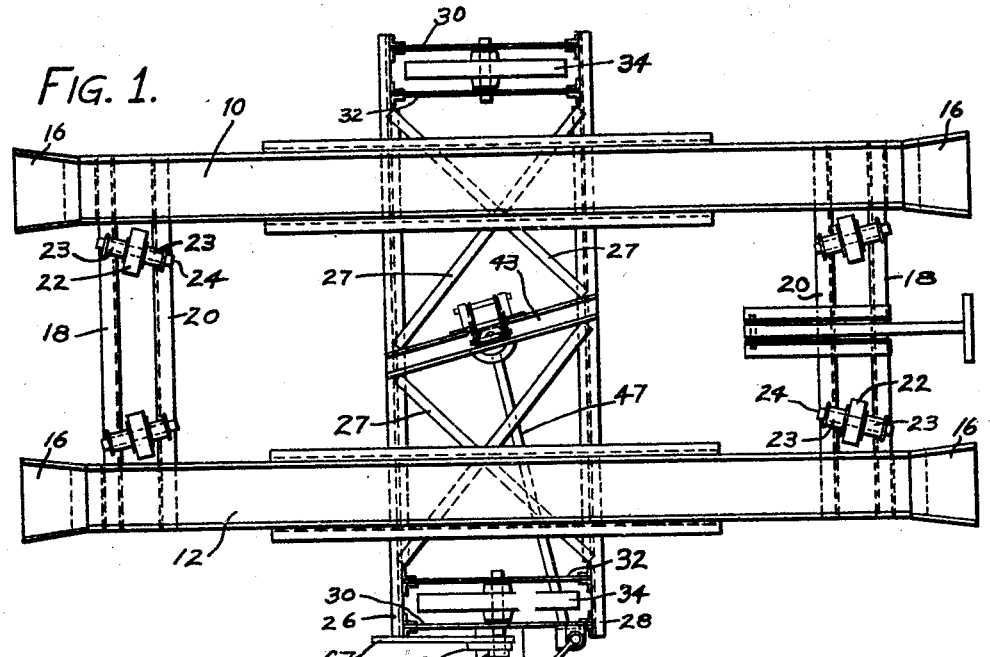
Fig. 1.
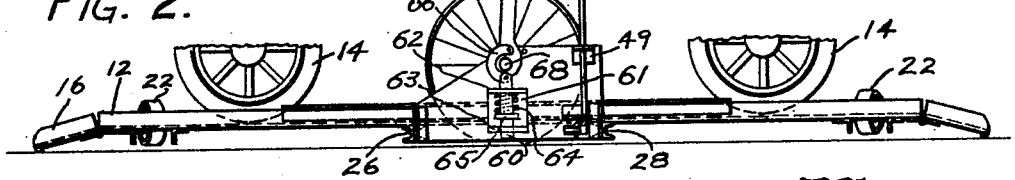
Fig. 2.
Fig. 3.  Fig. 4.
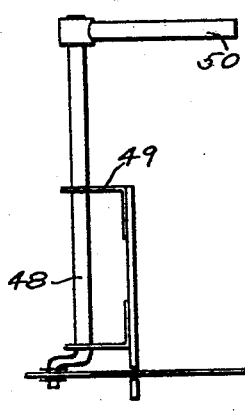
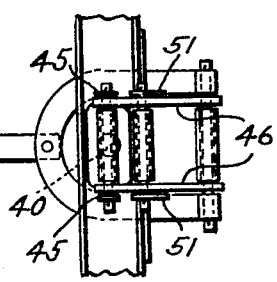
INVENTOR
AUGUSTUS SMITH
BY HIS ATTORNEYS
Howson and Howson Patented Jan. 26, 1932

1,843,047

UNITED STATES PATENT OFFICE

AUGUSTUS SMITH, OF ROSELLE, NEW JERSEY, ASSIGNOR TO BERGEN POINT IRON WORKS, OF BAYONNE, NEW JERSEY, A CORPORATION OF NEW JERSEY

TURNTABLE

Application filed March 25, 1931. Serial No. 525,258.

This invention relates to portable turntables such as are commonly used for turning around automobiles and the like. It is an object of this invention to make a turntable having a large pair of wheels which carry the weight of the device when it is being moved rectilinearly, and most of the weight of the device and its load when it is being rotated. Rollers at each end assist rotation of the turntable, when the vehicle is eccentrically mounted thereon. Another object is to provide a turntable with means to locate it at a particular spot in order to ensure the rotation of the turntable at that spot. Other objects and advantages will appear as the invention is described in connection with the accompany drawings:—

In the drawings:—

Figure 1 is a plan view of my turntable.

Figure 2 is a side elevation view of my turntable.

Figure 3 is a detailed side elevation view of the pivot mechanism used in my turntable.

Figure 4 is a plan view of the pivot mechanism.

Referring to the drawings the turntable has two parallel channel beams 10, 12 upon which the wheels 14 of the automobile or other vehicle may roll in placing the vehicle upon the turntable. At each end of these channel beams are hinged ramps or runways 16 to facilitate the running of the vehicle upon and off the turntable. The channel beams 10, 12 are spaced apart and secured at each end by a pair of parallel angle iron spacers 18, 20; these spacers being themselves spaced apart sufficiently to permit the radial mounting of a small roller 22 adjacent to each corner of the turntable. Bearing members 23 are secured upon each of the spacer beams 18, 20 adjacent to each corner of the turntable, in which bearing is journalled an end of the axle 24 of the particular roller located in that corner. These bearings are so located that the axes of the wheels will intersect the pivotal axis of the turntable, as will hereinafter be described.

At the central portion of the turntable are two small I-beams 26, 28 which extend transversely of the turntable to carry the weight to the two large wheels 34 which are mounted on either side between a pair of parallel bearing plates 30, 32. In order that these bearing plates may be outside of the channel beams, the transverse beams 26, 28 are of sufficient length to extend a short distance beyond the channel beams 10, 12. Between the bearing plates 30, 32 are mounted two large wheels 34, the axis of which lie in a cross diameter which passes through the pivotal axis of the turntable. These wheels 34 are so mounted that when a vehicle is rolled upon the turntable and is balanced thereon, the end rollers will clear the floor. Thus so long as perfect balance is maintained the main wheels 34 carry all the weight of the turntable and its load. Braces 27 between transverse beams 26, 28 are also provided to strengthen the apparatus.

In order that the turntable may be held at and rotated about a particular spot, there is provided a pivot whose axis is the vertical axis of rotation or pivotal axis of the turntable. This pivot comprises a pin 40 having a foot with a roughened or pointed lower surface which may be caused to press against and grip the floor at the will of the operator by the following means. A horizontal annular plate 41 is seated on a shoulder which is formed on the pin a few inches from its lower end and a spring 42 presses against this plate and against the lower surface of a channel iron cross bar 43 whose ends are joined to the transverse beams 26, 28. The pivot pin 40 passes through an aperture in the cross bar 43 and is guided at its upper end, during its vertical movement, by the walls of that aperture. The pivot is guided at its lower end by the walls of an aperture in a guide plate 44 through which the pin also passes. This plate 44 may be secured to the cross beam 43 in any suitable manner.

The upper end of the pin 40 is connected by a linkage mechanism to a hand lever located at the side of the turntable near one of the large wheels. This linkage mechanism comprises a pair of identical and parallel links 45 which are pivotally connected at one end to the upper end of the pin while their other ends are connected to the ends of identical and parallel bell crank levers 46 which are pivoted upon posts 51 secured to the cross bar 43. The other ends of these bell crank levers 46 are pivotally connected with the bifurcated end of a connecting bar 47 whose other end is connected to a vertical crank 48. This crank is pivotally mounted in two spaced bearing arms 49 which are secured to and extend outwardly from one of the bearing plates 30. To the upper end of this crank member 48 a handle 50 is secured. Thus, as the handle is rotated it causes rotation of the crank member 48 which moves the connecting bar 47 which in turn actuates the bell crank 46 and the bell crank, through the link 45, moves the pivot pin 40 up or down against or with the action of the coil spring 42.

In order that the pivot 40 may be held in raised position against the pressure of the spring 42, the crank 48 may be permitted to rotate just past a dead center position and rest against a stop. The parts are shown in this position in Figure 3. It will be understood that in the dead center position the spring will be compressed its maximum amount, and the pivot will correspondingly be raised off the floor as far as is possible. Upon rotation of the crank back through dead center position the spring will cause the pivot to drop until it strikes the floor and the crank and handle will rest in the positions they then occupy.

In order to keep the turntable from pivoting while a vehicle is moving on or off it, I provide at the side of the turntable a vertically movable pin 60 the lower end of which can engage the floor. When the floor is engaged by both the pin 60 and the pivot pin 40, it is obvious that the turntable will be immovable under the stresses ordinarily applied. The pin 60 may have its lower end roughened or spiked so as to firmly grip the floor. The pin 60 is guided in its movement by a bracket 61 secured to the plate 30 at one side of the turntable, the pin passing through apertures in spaced horizontal arms 62, 63 of the bracket and being pressed floorward by a spring 64 which bears against the under side of the upper arm 62 of the bracket and against a collar 65 or like device secured to the middle portion of the pin 60.

To move the pin 60 up against the action of spring, a link 66 may be pivotally connected at one end to the top of the pin 60 and at the other end to a hand lever 67 which may conveniently be pivotally mounted on an extension of the hub 68 of one of the wheels 34. The connections of this linkage mechanism are so arranged that when the hand lever 67 is vertical the pin 60 will be raised off the floor. And when the hand lever is moved slightly passed vertical it will rest against a stop device, for example, a pin or bolt 69 and will thus hold the pin 60 elevated. The parts are shown in this position in Figure 2.

To lower the pin 60 it is simply necessary to move the hand lever up through vertical and on down to horizontal. The spring 64 will cause the pin to engage the floor.

In the operation of my device, after the pin 60 is lowered as above described the vehicle is rolled up the ramps 16 on to the channel beams 10, 12 until the center of gravity of the vehicle is vertically above the axis of the wheels 34. The turntable is then balanced and the end rollers 22 will be raised off the floor. Now the brakes of the vehicle may be set. Then the hand lever 67 is manipulated to raise the pin 60. Now the turntable may be rotated with ease since all the wheels of the turntable are tangential to the axis of rotation. After the turntable has been rotated to a given position the pin 60 is again lowered by hand lever 67 and the vehicle is rolled off. The pivot 40 can now be raised and the turntable may be rolled away to the proper position for another vehicle.

It should be noted that the wheels 34 carry the weight of the turntable and its load, if the loading is exactly central. But in case the vehicle is not perfectly balanced, the corner rollers 22 will take care of the eccentricity and will rotate on radii passing through the main pivotal axis to hold the ends of the apparatus from dragging on the floor. Thus it will be noted that I have provided a simple and efficient construction for a movable turntable which possesses the advantages of easy transportation forward or backward and easy rotation about a given point after the turntable has been rolled to that point.

Many modifications within the scope of my invention will occur to those skilled in the art. Therefore I do not limit myself to the specific construction shown.

I claim:—

1. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively.

2. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and rollers mounted adjacent the ends of the turntable to take care of any eccentricity in loading.

3. A transportable turntable comprising vehicle supporting beams secured together in spaced relation, a centrally located vertical pivot, a plurality of wheels for carrying chiefly the turntable and its load whether the turntable is moved rectilinearly or rotatively, a vertical pivot movable to engage and disengage the floor, the axes of said wheels being in a cross diameter passing through the axis of said pivot, and a plurality of rollers located adjacent the corners of the turntable, the axes of said rollers all passing through the axis of said pivot.

4. A transportable turntable comprising vehicle supporting beams secured together in spaced relation, a centrally located vertical pivot about which the turntable may rotate, a spring normally pressing said pivot toward the floor, linkage mechanism connected to said pivot, a crank and handle connected with said linkage mechanism whereby said pivot may be moved vertically, said handle being in an accessible position at the side of the turntable, in combination with a pair of wheels for carrying the main portion of the weight of the turntable and load whether the turntable is moving rectilinearly or rotatively, the axes of said wheels being in a cross diameter of the turntable passing through the axis of said pivot.

5. A transportable turntable comprising vehicle supporting beams secured together in spaced relation, a centrally located vertical pivot about which the turntable may rotate, a spring normally pressing said pivot toward the floor, linkage mechanism connected to said pivot, a crank and handle connected with said linkage mechanism whereby said pivot may be moved, said handle being in an accessible position at the side of the turntable, in combination with a pair of wheels for carrying the main portion of the weight of the turntable and load whether the turntable is moved rectilinearly or rotatively, the axes of said wheels being in a cross diameter of the turntable passing through the axis of said pivot, and a plurality of rollers located adjacent the corners of the turntable the axes of said rollers passing through the axis of said pivot.

6. A transportable turntable comprising vehicle supporting beams secured together in spaced relation a centrally located vertical pivot about which the turntable is rotatable, a vertical crank having a handle thereon at the side of the turntable for raising and lowering said pivot, a pair of supporting wheels having their axes in a cross diameter passing through the axis of said pivot, whereby said wheels will chiefly carry the turntable and its load whether the turntable is moving rectilinearly or rotatively.

7. A transportable turntable comprising vehicle supporting beams secured together in spaced relation a centrally located vertical pivot about which the turntable is rotatable, means at the side of the turntable for moving said pivot vertically, a pair of supporting wheels having their axes in a cross diameter passing through the axis of said pivot, whereby said wheels will chiefly carry the turntable and its load whether the turntable is moving rectilinearly or rotatively.

8. A transportable turntable comprising vehicle supporting beams secured together in spaced relation, a centrally located vertical pivot about which the turntable is rotatable, means at the side of the turntable for moving said pivot vertically, a pair of supporting wheels having their axes in a cross diameter passing through the axis of said pivot, whereby said wheels will chiefly carry the turntable and its load whether the turntable is moving rectilinearly or rotatively, and rollers mounted adjacent the ends of the turntable to take care of any eccentricity in loading.

9. A transportable turntable comprising vehicle supporting beams secured together in spaced relation, a centrally located vertical pivot about which the turntable is rotatable, a spring pressing said pivot floorward, a link connected to said pivot, a bell crank connected to said link, handle and crank means for moving said bell crank, in combination with a pair of supporting wheels having their axes in a cross diameter passing through the axis of said pivot, whereby said wheels will chiefly carry the turntable and its load whether the turntable is moving rectilinearly or rotatively.

10. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and means holding said turntable against rotation while a vehicle is being moved on or off of it.

11. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and means spaced from said pivot for holding said turntable against rotation while a vehicle is being moved on or off of it.

12. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and means holding said turntable against rotation while a vehicle is being moved on or off of it, and means horizontally spaced from said pivot and engageable with the floor to steady the turntable.

13. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and vertically movable means engageable with the floor to steady the turntable.

14. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, and means holding said turntable against rotation while a vehicle is being moved on or off of it, and manually operable linkage mechanism for operating said holding means.

15. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, means holding said turntable against rotation while a vehicle is being moved on or off of it, and means normally urging said holding means floorward.

16. A transportable turntable comprising vehicle supporting beams secured together in spaced relation, a centrally located vertical pivot about which the turntable is rotatable, mechanism for causing said pivot to move vertically to engage and disengage the floor, a pair of supporting wheels having their axes in a cross diameter passing through the axis of said pivot, whereby said wheels chiefly will carry the turntable and its load whether the turntable is moved rectilinearly or rotatively, means holding said turntable against rotation while a vehicle is being moved on or off of it, means normally urging said holding means floorward, and linkage mechanism for operating said holding means and controlling said urging means.

In testimony whereof I have signed my name to this specification.

AUGUSTUS SMITH.